(No Model.)
G. W. FREEMAN.
ROAD CART.
No. 458,021. Patented Aug. 18, 1891.
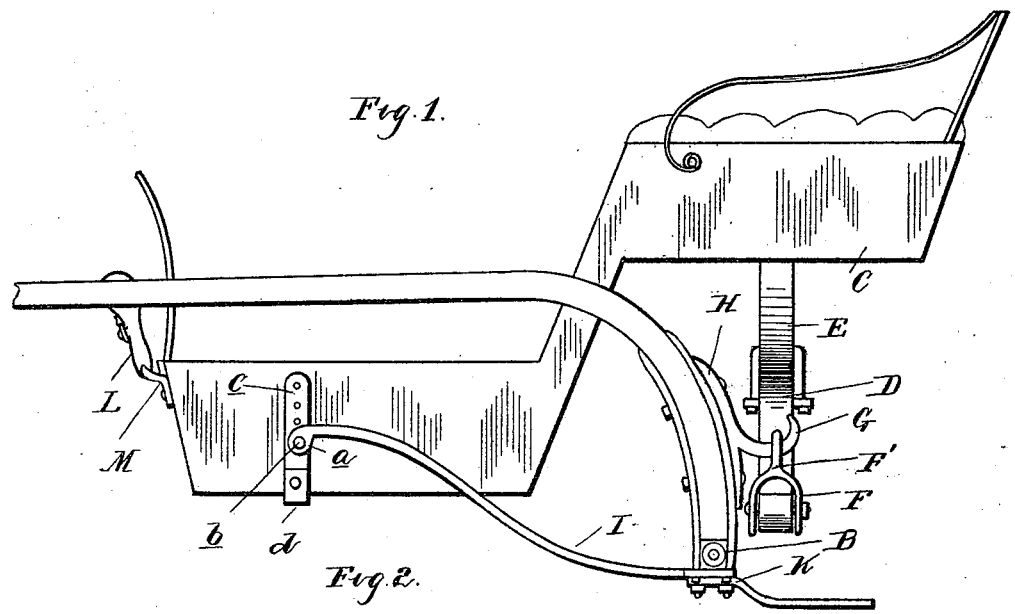
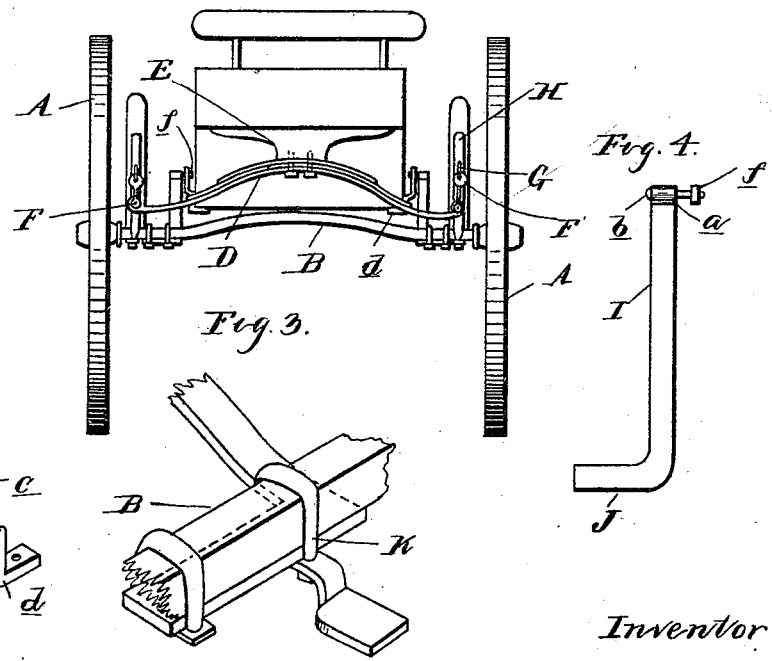
Witnesses
A. L. Hobbie
M. B. O'Dogherty
Inventor
George W. Freeman
By [signature]
Atty.

UNITED STATES PATENT OFFICE.

GEORGE W. FREEMAN, OF LANSING, MICHIGAN.

ROAD-CART.

SPECIFICATION forming part of Letters Patent No. 458,021, dated August 18, 1891.

Application filed May 1, 1891. Serial No. 391,266. (No model.)

*To all whom it may concern:*

Be it known that I, GEORGE W. FREEMAN, a citizen of the United States, residing at Lansing, in the county of Ingham and State of Michigan, have invented certain new and useful Improvements in Road-Carts, of which the following is a specification, reference being had therein to the accompanying drawings.

This invention relates to new and useful improvements in two-wheeled vehicles of that class generally known as road-carts; and the invention consists in the peculiar construction of the spring-support for the body, and, further, in the peculiar construction, arrangement, and combination of the various parts, all as more fully hereinafter described.

In the drawings, Figure 1 is a side elevation of my improved cart with the wheels detached. Fig. 2 is a rear elevation thereof. Fig. 3 is a detached perspective view showing the connection of the side springs and axle. Fig. 4 is a plan view of one of the side springs detached from the axle. Fig. 5 is a detached perspective view of the plate to which the forward end of the side springs is attached.

A are the wheels, B is the axle, and C is the body, of the road-cart, these parts being of the known and usual construction.

D is a semi-elliptical spring centrally secured to the spring-bar E, which is secured in turn beneath the seat of the body. This spring is secured at its ends to the shafts by means of the clevis F, having the eye F' arranged at right angles to the plane of the clevis and engaging with a hook G, secured by means of the plate H to the heel of the shaft, and preferably so constructed that the same bolt that secured the shaft-iron in position will also secure this hook. It is evident from this construction that the spring is free to spring in any direction, either laterally or longitudinally of the cart. The forward end of the body I support from the axle by means of the quarter-springs I, clipped at their rear end to the axle and extending forwardly to the front end of the body, where they are secured to the body in any suitable manner, preferably by an eye *a* in the spring, through which a bolt *b* passes. This bolt is adapted to engage in any one of a series of apertures in the plates *c*, secured to the side of the body by means of the angle-irons *d*. The plate *c* is provided with an offset *e*, which allows of securing a nut *f* upon the bolt *b* between the plate *c* and the body.

I am enabled to quickly adjust the front of the body at any desired angle to the ground which is necessary to enable me to keep the seat level under varying loads or with horses of different height.

The side springs are preferably constructed of a single leaf, and at the rear end and formed integral therewith provided with the offset J, extending at right angles to the main portion of the spring and beneath the axle, the clips K encircling the axle and the offset to hold the spring firmly in position.

L are safety-straps secured at their upper end, to the cross-bar and at their lower ends to an eye M, fastened to the front of the body. These safety-straps are brought into play only in case the entire weight of the rider is brought upon the front end of the cart and are simply to prevent damage to the spring I. When the occupant is in the seat, the main portion of the weight of the rider is supported directly by the semi-elliptical spring D. This construction of spring-support gives the best result in easy-riding qualities and with the least possible horse motion.

What I claim as my invention is—

1. In a road-cart, the combination, with the axle, shafts, and body, of a spring-support for the body, consisting of a rear cross-spring swung from a point near the axle, springs at the sides of the body rigidly secured to the axle and extended upwardly and forwardly to a point in the rear of the front of the body, perforated plates on the sides of the body, and pivotal connections between the ends of the side springs and the plates, substantially as described.

2. In a road-cart, the combination, with the shafts, axle, and body, of a cross-spring swung from a point near the axle and supporting the seat, two side springs rigidly secured to the axle and extending forwardly and curved upwardly to a point in the rear of the front of the body, an adjustable connection between the forward ends of the side springs and the outer sides of the body, a cross-bar between the shafts, straps over the cross-bar, and eyes on the front of the body through which the straps pass, substantially as described.

3. In a road-cart, the combination, with the shafts, axle, and body, of a cross-spring supporting the rear of the body, side springs rigidly secured to the axle and extending forwardly to points slightly in the rear of the front of the body, side plates on the outer faces of the sides of the body, their upper ends extending outwardly and upwardly to form a space between the upper ends and the body, and bolts passing through the forward ends of the side springs and the upper ends of the side plates, substantially as described.

In testimony whereof I affix my signature, in presence of two witnesses, this 11th day of April, 1891.

GEORGE W. FREEMAN.

Witnesses:
    JAMES P. EDMONDS,
    B. DEWER.